June 27, 1933.  M. C. EARLY  1,915,819
LIQUID DESICCATING APPARATUS
Filed May 7, 1931
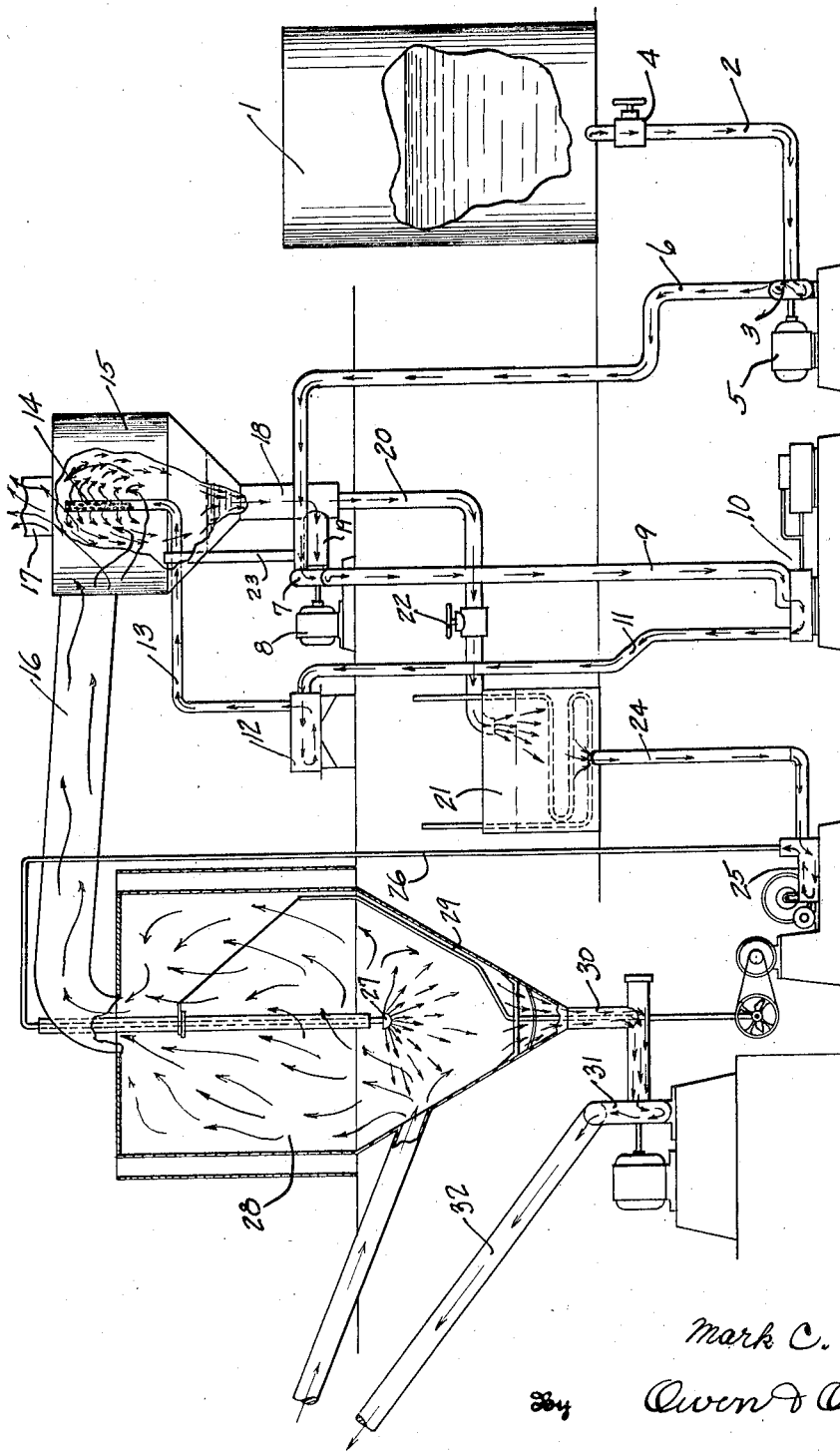

Patented June 27, 1933

1,915,819

UNITED STATES PATENT OFFICE

MARK C. EARLY, OF LIMA, OHIO, ASSIGNOR TO THE POWDERED MALT CORPORATION, OF LIMA, OHIO, A CORPORATION OF OHIO

LIQUID DESICCATING APPARATUS

Application filed May 7, 1931. Serial No. 535,602.

This invention relates to apparatus for reducing liquids to powdered form, and while it may be advantageously used for the concentrating of milk and other liquids containing solids in solution, it is particularly intended and designed for use in the reduction of malt liquids to powdered form.

In the handling and treatment of liquids for such purpose, and particularly hop flavored malt liquids, considerable difficulty is encountered, due to the accumulation of foam in the system, the presence of which materially lessens the capacity of the apparatus. The primary object of my invention is to so handle the liquid and the foam generated therefrom in its passage through the system, as to reduce to a minimum the troubles incident to the presence of foam, thereby materially increasing the capacity of production and enhancing the practicability and commercial value of the apparatus. Other objects and advantages of the invention will be apparent from the following specification.

While the invention in its broader aspect is capable of embodiment in different forms, one embodiment thereof is illustrated in the accompanying drawing which is an elevation, somewhat in diagram, of an apparatus embodying the invention, with parts broken away.

In the drawing, 1 designates a tank for containing the liquid to be treated, and 2 a delivery pipe leading therefrom to a pump 3 and having a control-valve 4 therein. The pump 3 is illustrated in the present instance as being of the rotary type, but may be of any other suitable form, and is driven by a motor 5. The outlet of the pump 3 is connected by a feed pipe 6 to the inlet side of a second pump 7, also preferably of the rotary type, and driven by a motor 8. The outlet from the pump 7 is connected by a pipe 9 to a pressure stepping-up pump 10, which is of the piston type. In practice it is found that a two-cylinder duplex steam driven pump is satisfactory for this purpose. The discharge from the pump 10 is through a pipe 11, a heater 12 of any suitable type, and pipe 13, which terminates at its end in a spray nozzle 14 within the first concentrating tank 15 of the system, which tank in practice is termed a "copper".

The nozzle 14 extends upright within the central portion of the copper, and is provided with a plurality of fine discharge orifices by which the liquid is discharged in a plurality of small streams into the copper. Air is discharged into the copper 15, through a conduit 16, and is caused to circulate within the copper in intermingling relation to the liquid streams discharged therein, so as to facilitate evaporation or concentration of the liquid, the air finding its exit from the copper 15, through an outlet 17 in its top. The concentrated liquid, which is now in foam form, particularly if hop flavored malt is being treated, gathers in the bottom of the copper 15, which is preferably of conical form, and feeds therefrom through a large outlet pipe 18, which has communication at one side through a branch 19, with the inlet side of the pump 7, and also has communication below said branch, through a more restricted pipe 20 with a settling-vat 21. The discharge from the pipe 20 is controlled by a valve 22.

The discharge from the pipe 20 is so restricted relative to the foam or foam and liquid flowing through the outlet 18 and branch 19 to the pump 7, that only a small portion of the circulating fluid is discharged into the settling-vat, the major portion being added to the supply of fresh liquid received by the pump 7, through the feed pipe 6, and is then re-circulated through the pipes 9, 11 and 13, and again discharged into the copper 15, thus materially facilitating the concentration of the liquid.

When hop flavored malt liquid or wort is being treated, the malt liquid that is sprayed into the copper 15 is changed entirely to foam, so that there is practically no liquid in the copper or its discharge pipe. In the treatment of other liquids, however, the contents of the copper may be both a foam and a liquid. It is, therefore, thought proper to refer to the contents of the copper as being a fluid, which is broad enough to cover both a foam or a foam and liquid combined. The foam which is present in the copper is discharged through the outlet 18 both to the pump 7 and to the settling-vat 21.

With the apparatus heretofore used, so far as I am aware, and of which apparatus the present is an improvement, the outlet from the pump 7 was connected directly through the heater 12 with the interior of the copper. With this arrangement it was found that the presence of the foam in the fluid, which was acted on by the pump 7, caused the pump to become air-bound, so that its efficiency was materially lessened, if not entirely destroyed. It was found that by introducing a second pump, preferably of the piston type as indicated at 10, between the outlet of the rotary pump 7 and copper 15, that the original discharging pressure of the liquid into the copper was not only maintained, but materially increased, thereby facilitating the concentrating action of the liquid within the copper. It was also found that the trouble incident to the presence of the foam within the fluid acted on by the pump 7 was overcome to a considerable extent by providing an air-vent in the connection between the copper and the pump 7. This vent is preferably located in the branch 19, near the inlet to the pump 7, and comprises a pipe 23, which has its outlet end projecting into the copper 15, and discharging therein above its foam level line, as shown.

The fluid which is discharged into the settling-vat 21 is mainly foam, thus causing the foam to build up in the vat and run over its edges after the apparatus has been running a short time. This trouble has been entirely eliminated by introducing a heating coil in the vat, through which steam is passed to maintain a temperature, preferably between 170° and 200° F. in the vat. The higher the temperature the better the results, but it is found necessary to keep the temperature down within safe degrees, so as not to ruin the packing in the high-pressure pump hereinafter referred to. It is found in practice that the presence of such heat within the settling-vat increases the capacity of the plant by about fifty pounds of powder per hour.

The discharge from the settling-vat 21 is through a pipe 24 to the inlet side of a high-pressure pump 25 by which the liquid is forced, preferably under a pressure of about 4500 lbs. through a relatively small discharge pipe 26, and in spray form from a nozzle 27 at the discharge end thereof into a dryer 28, where the final concentration of the liquid into powder-form takes place. Air, preferably heated, is circulated through the dryer 28 to facilitate drying, as well understood in the art, and such air then passes from the upper end of the dryer, through the conduit 16 to the copper 15. A power-driven agitator-plate 29 is rotated within the bottom portion of the dryer to prevent the powder from collecting on the side walls of the dryer. The powder which is collected within the dryer is discharged from the bottom thereof through a conduit 30 leading to a rotary pump 31, the discharge pipe 32 of which leads to a storage bin (not shown). Nothing particularly new is claimed for the dryer or the manner of discharging the concentrated liquid therein, other than that a considerably higher pressure is employed for discharging the liquid into the dryer than has heretofore been the case, thus materially increasing the output.

While it is not desired to be restricted to any particular size or proportions of the circulating pipes used in the system, in practice it is found that very good results are obtained by making the feed pipes 2, 6 one and one-half (1½) inches in diameter, the pipe 9 from the rotary pump 7 to the pump 10 two and three-fourths (2¾) inches in diameter. The pipes 11, 13 two (2) inches in diameter, the pipe 18 and its branch 19 four (4) inches in diameter, the pipe 20 two (2) inches in diameter, and the vent-pipe 23 two and three-fourths (2¾) inches in diameter. The pipe 24 leading from the vat to the high-pressure pump is two (2) inches in diameter, and a three-eighth (⅜) inch pipe is employed for the discharge pipe 26.

In operation, fresh liquid is fed by the rotary pump 3 from the tank 1, through the pipes 2 and 6 to the rotary pump 7, where it joins a portion of the foam or foam and partially concentrated liquid passing from the copper 15, and is delivered to the pressure-augmenting pump 10, through the pipe 9, and thence through the pipe 11, heater 12 and pipe 13, to the interior of the copper 15, where it is discharged in fine spray form. A portion of the foam or foam and liquid, which passes from the copper 15, is delivered by the pipe 20 to the settling-vat 21, the quantity of such discharge being determined by a regulation of the valve 22. The feed of fresh liquid from the tank 1 to the pump 7 should be sufficient to maintain the foam at substantially a constant level in the copper, such for instance, as shown. It is, therefore, apparent that the feed of fresh liquid is dependent on the quantity of fluid discharging into the settling-vat 21 and the loss resulting in the liquid from evaporation in the copper. The concentrated liquid discharging from the settling-vat, through the pipe 24, is acted on by the high-pressure pump 25 and forced at a high pressure, preferably at around 4500 lbs., through the pipe 26 and its nozzle 27, into the dryer 28, where the remaining liquid is evaporated and the resulting powder collected.

I wish it understood that my invention is not limited to any specific construction, arrangement or form of the parts, or to the temperatures or dimensions designated, as it is capable of numerous modifications and changes in such respects without departing from the spirit of the claims.

Having thus described my invention, what I claim as new and desire to secure by United States Letters Patent is:

In apparatus for concentrating malt liquid, a copper provided with a vapor outlet, a settling vat, means for first partially evaporating the liquid by heating the same and spraying it into said copper, means for conveying the partially concentrated liquid from the copper to the settling vat, means for heating the material in the settling vat to reduce the foam content thereof to liquid form, a drying chamber, and means for discharging the resultant liquid under high pressure from the settling vat into said drying chamber.

In testimony whereof I have hereunto signed my name to this specification.

MARK C. EARLY.